(12) United States Patent
Pan et al.

(10) Patent No.: US 9,135,370 B2
(45) Date of Patent: *Sep. 15, 2015

(54) METHOD AND APPARATUS OF GENERATING UPDATE PARAMETERS AND DISPLAYING CORRELATED KEYWORDS

(71) Applicant: Alibaba Group Holding Limited, Grand Cayman (KY)

(72) Inventors: Lei Pan, Zhejiang (CN); Yuanhu Yao, Hangzhou (CN); Zhen Yang, Hangzhou (CN); Tianji Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/496,256

(22) Filed: Sep. 25, 2014

(65) Prior Publication Data

US 2015/0106391 A1 Apr. 16, 2015

Related U.S. Application Data

(63) Continuation of application No. 14/160,364, filed on Jan. 21, 2014, now Pat. No. 8,874,588, which is a continuation of application No. 12/594,930, filed as application No. PCT/CN2007/070573 on Aug. 28, 2007, now Pat. No. 8,676,811.

(30) Foreign Application Priority Data

Apr. 10, 2007 (CN) .......................... 2007 1 0095848

(51) Int. Cl.
*G06F 17/30* (2006.01)

(52) U.S. Cl.
CPC ........ *G06F 17/3097* (2013.01); *G06F 17/3064* (2013.01); *G06F 17/30699* (2013.01)

(58) Field of Classification Search
CPC .................................................. G06F 17/3053

USPC .......................................................... 707/748
See application file for complete search history.

(56) References Cited

U.S. PATENT DOCUMENTS

| 6,169,986 B1 | 1/2001 | Bowman et al. |
| 6,523,028 B1* | 2/2003 | DiDomizio et al. .......... 707/748 |

(Continued)

FOREIGN PATENT DOCUMENTS

| CN | 1299488 A | 6/2001 |
| CN | 1922605 A | 2/2007 |

(Continued)

OTHER PUBLICATIONS

Sieg. et al., Web Search Personalization with Ontological User Profiles, Nov. 10, 2007.*

(Continued)

*Primary Examiner* — Noosha Arjomandi
(74) *Attorney, Agent, or Firm* — Lee & Hayes, PLLC (57) ABSTRACT

Provided is a method of generating updating parameters. The method obtains search keywords used by users within a predetermined time period; counts the search keywords to obtain primary keywords, related keywords, co-search frequencies of each primary keyword and the respective related keywords being searched together, and search frequencies of the primary keywords being searched alone; computes first feature values based on the search frequencies of the primary keywords being searched alone; and then computes second feature values based on the first feature values and the co-search frequencies of the primary keywords and the respective related keywords. The second feature values serve as updating parameters for determining displaying modes of the related keywords. An apparatus of generating updating parameters, and a method and an apparatus of displaying related keywords according to the updating parameters are also provided. The solution keeps abreast with the user trends to allow a better user experience and improve computing performance and efficiency. For a service provider, no special secret algorithm is needed, and the operation is easy with a low development cost.

20 Claims, 4 Drawing Sheets

(56) References Cited

U.S. PATENT DOCUMENTS

| | | | |
|---|---|---|---|
| 7,853,557 | B2 | 12/2010 | Schneider et al. |
| 7,937,403 | B2* | 5/2011 | Kehl .............................. 707/767 |
| 2004/0059729 | A1 | 3/2004 | Krupin et al. |
| 2005/0071332 | A1 | 3/2005 | Ortega et al. |
| 2005/0102259 | A1* | 5/2005 | Kapur ............................... 707/1 |
| 2006/0015504 | A1 | 1/2006 | Yu et al. |
| 2006/0106767 | A1 | 5/2006 | Adcock et al. |
| 2006/0117003 | A1 | 6/2006 | Ortega et al. |
| 2006/0129534 | A1 | 6/2006 | Jones et al. |
| 2007/0027865 | A1 | 2/2007 | Bartz et al. |
| 2007/0106659 | A1* | 5/2007 | Lu et al. ............................ 707/5 |
| 2007/0112764 | A1 | 5/2007 | Yih et al. |
| 2008/0010269 | A1* | 1/2008 | Parikh ............................... 707/5 |
| 2008/0016042 | A1 | 1/2008 | McKnight |
| 2008/0104050 | A1 | 5/2008 | Kehl |
| 2009/0063461 | A1 | 3/2009 | Wang et al. |
| 2009/0198674 | A1 | 8/2009 | Custis et al. |
| 2010/0082665 | A1* | 4/2010 | Tanaka ......................... 707/769 |
| 2010/0121860 | A1 | 5/2010 | Pan et al. |
| 2010/0185619 | A1* | 7/2010 | Zhang et al. .................. 707/738 |

FOREIGN PATENT DOCUMENTS

| | | |
|---|---|---|
| JP | 06314296 A | 11/1994 |
| JP | 07056948 A | 3/1995 |
| JP | 09319767 A | 12/1997 |
| JP | 2002007450 A | 1/2002 |
| JP | 2002092032 A | 3/2002 |
| JP | 2002507794 A | 3/2002 |
| JP | 2003323433 A | 11/2003 |
| WO | WO9948028 A2 | 9/1999 |

OTHER PUBLICATIONS

Sieg et al., Learning Ontology-Based User Profiles: A Semantic Approach to Personalized Web Search, Nov. 12, 2007.*

The Chinese Office Action mailed Mar. 10, 2010 for Chinese patent application No. 200710095848.7, a counterpart foreign application of U.S. Appl. No. 12/594,930, 3 pages.

The Japanese Office Action mailed Apr. 22, 2014 for Japanese patent application No. 2013-076189, a counterpart foreign application of U.S. Pat. No. 8,676,811, 6 pages.

The Japanese Office Action mailed Jun. 29, 2012 for Japanese patent application No. 2010502405, a counterpart foreign application of U.S. Appl. No. 12/594,930, 6 pages.

Office Action for U.S. Appl. No. 14/160,364, mailed on Apr. 22, 2014, Lei Pan, Method and Apparatus of Generating Update Parameters and Displaying Correlated Keywords,, 15 pages.

Ohkubo et al., "Extracting Information Demand by Analzing a WWW Search Log," Transactions of Information Processing Society of Japan, vol. 39, No. 7, Information Processing Society of Japan, Jul. 15, 1998 pp. 2250-2258.

The Japanese Office Action mailed Jan. 27, 2015 for Japanese patent application No. 2013-076189, a counterpart foreign application of U.S. Appl. No. 12/594,930, 6 pages.

* cited by examiner

METHOD AND APPARATUS OF GENERATING UPDATE PARAMETERS AND DISPLAYING CORRELATED KEYWORDS

RELATED APPLICATIONS

This application is a continuation of and claims priority to U.S. patent application Ser. No. 14/160,364 filed on Jan. 21, 2014 which is a continuation of U.S. patent application Ser. No. 12/594,930, filed on Nov. 6, 2009 which was the national stage application based on international patent application PCT/CN2007/070573 filed on Aug. 28, 2007, which claims priority from Chinese Patent Application No. 200710095848.7, which was filed in China Patent Office on Apr. 10, 2007, entitled "METHOD AND APPARATUS OF GENERATING UPDATE PARAMETERS AND DISPLAYING CORRELATED KEYWORDS," which applications are hereby incorporated in their entirety by reference.

TECHNICAL FIELD

The present invention relates to the field of data processing, and particularly relates to methods and apparatuses of generating updating parameters, and methods and apparatuses of displaying related keywords.

BACKGROUND ART

Along with the rapid increase of the use of texts and multimedia contents on the Internet and other data networks and systems, a user has become increasingly reliant on keyword-based search tools to find required information. Normally, a user enters a keyword of an inquired information document into a search tool or engine. The search tool or engine then performs a search in an indexed database and returns a search result. Generally, existing search tools or engines may further display, on a current web page or a current result page, one or more related keywords corresponding to the user input keyword (i.e., the primary keyword).

As commonly known, most users begin an online information search at a search engine, and generally search the needed information by inputting a keyword. With the accelerating pace of social changes and ongoing cultural developments, many of the fixed keywords are failing to meet the various needs of users. In particular, existing keyword search methods are no longer able to satisfy various needs of the users due to the information explosion. Keyword records are fixed, may have been created at a much earlier time, and have infrequent updates, making them unable to satisfy the requirements of the changing online contents. Take "clothes" as an example of a primary keyword. Usually, related keywords obtained for this primary keyword using existing technologies are words like "activewear" and "down coat", etc. As the season changes, however, the related keywords that are actually wanted by a user may be "spring fashion", "summer fashion", and "T-shirt", etc. Keywords obtained using existing technologies do not adapt to a usage trend of the user.

As can be seen, keyword search of existing technologies cannot satisfy the needs of users, especially in that the keywords used do not adapt to the usage trends of the users.

DESCRIPTION OF THE INVENTION

The present invention is to provide a method and an apparatus of generating updating parameters such that keywords used can meet a usage trend of a user.

Correspondingly, another technical goal is to provide a method and an apparatus of displaying related keywords in order to ensure that a user can obtain related keywords in a simple and comprehensive manner.

In order to achieve the above goals, exemplary embodiments of the present invention disclose a method of generating updating parameters. The method obtains search keywords used by users within a predetermined time period; counts the search keywords to obtain primary keywords, related keywords, co-search frequencies of each primary keyword and the respective related keywords being searched together, and search frequencies of the primary keywords being searched alone; computes first feature values based on the search frequencies of the primary keywords being searched alone; and then computes second feature values based on the first feature values and the co-search frequencies of the primary keywords and the respective related keywords. The second feature values serve as updating parameters for determining displaying modes of the related keywords.

Preferably, the method further records the primary keywords, the related keywords and the second feature values to form a keyword information table.

Preferably, the above steps of counting the search keywords, computing the first feature values and computing the second feature values are concurrently executed using a multi-threading method.

Preferably, prior to computing the first feature values, the method further filters out search keywords that satisfy a filtering rule.

Preferably, to compute the second feature values, the method computes correlation levels based on the co-search frequencies of each primary keyword and the respective related keywords being searched together; and obtains the first feature values from a cache, and computing the second feature values based on the first feature values and the correlation levels.

Preferably, the keyword information table contains the first feature values corresponding to the primary keywords.

Preferably, the search keywords include search keywords used by search users and promulgated keywords posted by promulgating users.

The exemplary embodiments of the present invention further disclose an apparatus of generating updating parameters. In the apparatus, an acquisition unit is used for obtaining search keywords used by users within a predetermined time period; a statistics unit is used for counting the search keywords to obtain primary keywords, related keywords, co-search frequencies of each primary keyword and the respective related keywords being searched together, and search frequencies of the primary keywords being searched alone; a first computation unit is used for computing first feature values based on the search frequencies of the primary keywords being searched alone; and a second computation unit is used for computing second feature values based on the first feature values and the co-search frequencies of each primary keyword and the respective related keywords being searched together. The second feature values serve as updating parameters for determining displaying modes of the related keywords.

Preferably, the apparatus further includes a recording unit used for recording the primary keywords, the related keywords and the second feature values to form a keyword information table.

Preferably, the apparatus further includes a filtering unit connected with the statistics unit and used for filtering out search keywords that satisfy a filtering rule.

Preferably, the above the second computation unit may include a correlation computing sub-unit used for computing correlation levels based on the co-search frequencies of each primary keyword and the respective related keywords being searched together; and an acquiring/computing sub-unit used for obtaining the first feature values from a cache and computing the second feature values based on the first feature values and the correlation levels.

Preferably, the apparatus further includes an addition unit which is connected with the recording unit and used for recording the first feature values in the keyword information table.

The exemplary embodiments of the present invention further disclose a method of displaying related keywords. The method submits a request for acquiring related keywords based on a primary keyword inputted by a user. Based on the request, the method obtains related keywords whose second feature values are greater than or equal to a threshold. The Second feature values are computed based on a first feature value and co-search frequencies of the primary keyword and related keywords being searched together. The first feature value is computed based on a search frequency of the primary keyword being searched alone. The co-search frequencies of the primary keyword and related keywords being searched together and the search frequency of the primary keyword being searched alone are obtained by counting search keywords. Method then displays the obtained related keywords.

Preferably, the method further displays the related keywords having second feature values smaller than the threshold.

Preferably, the method obtains the related keywords whose second feature values are greater than or equal to the threshold from a keyword information table containing the primary keyword, the related keywords and the second feature values.

The exemplary embodiments of the present invention further disclose an apparatus of displaying related keywords. The apparatus includes an interface unit used for submitting a request for acquiring related keywords corresponding to a primary keyword inputted by a user. The apparatus also includes a related keyword acquisition unit used for acquiring related keywords whose second feature values are greater than or equal to a threshold according to the request. The second feature values are obtained based on a first feature value and co-search frequencies of the primary keyword and the related keywords being searched together, where the first feature value is obtained based on a search frequency of the primary keyword being searched alone. The frequencies of the primary keyword and related keywords being searched together and the frequency of the primary keyword being searched alone are obtained by counting search keywords. The apparatus further includes a first display unit used for displaying the acquired related keywords.

Preferably, the apparatus may further include a second display unit which is used for displaying related keywords having a second feature value smaller than the threshold.

As illustrated, the exemplary embodiments conduct statistical analyses on search keywords used by users within a predetermined time period in order to ensure timely relevance of the keywords. Using the second feature values as parameters for determining displaying modes of associated related keywords, the related keywords that satisfy current usage trends are provided to the users with preference, resulting in a better user experience.

EXEMPLARY EMBODIMENTS

In order to more clearly and easily understand the goals, characteristics and advantages of the present invention, the following exemplary embodiments illustrated the invention in further detail.

The exemplary embodiments of the present invention provide related keywords that satisfy the user search demand better based on updating correlation parameters between a primary keyword and corresponding related keywords, and control the outputs of the respective related keywords according to the updating correlation parameters.

Figure 1:
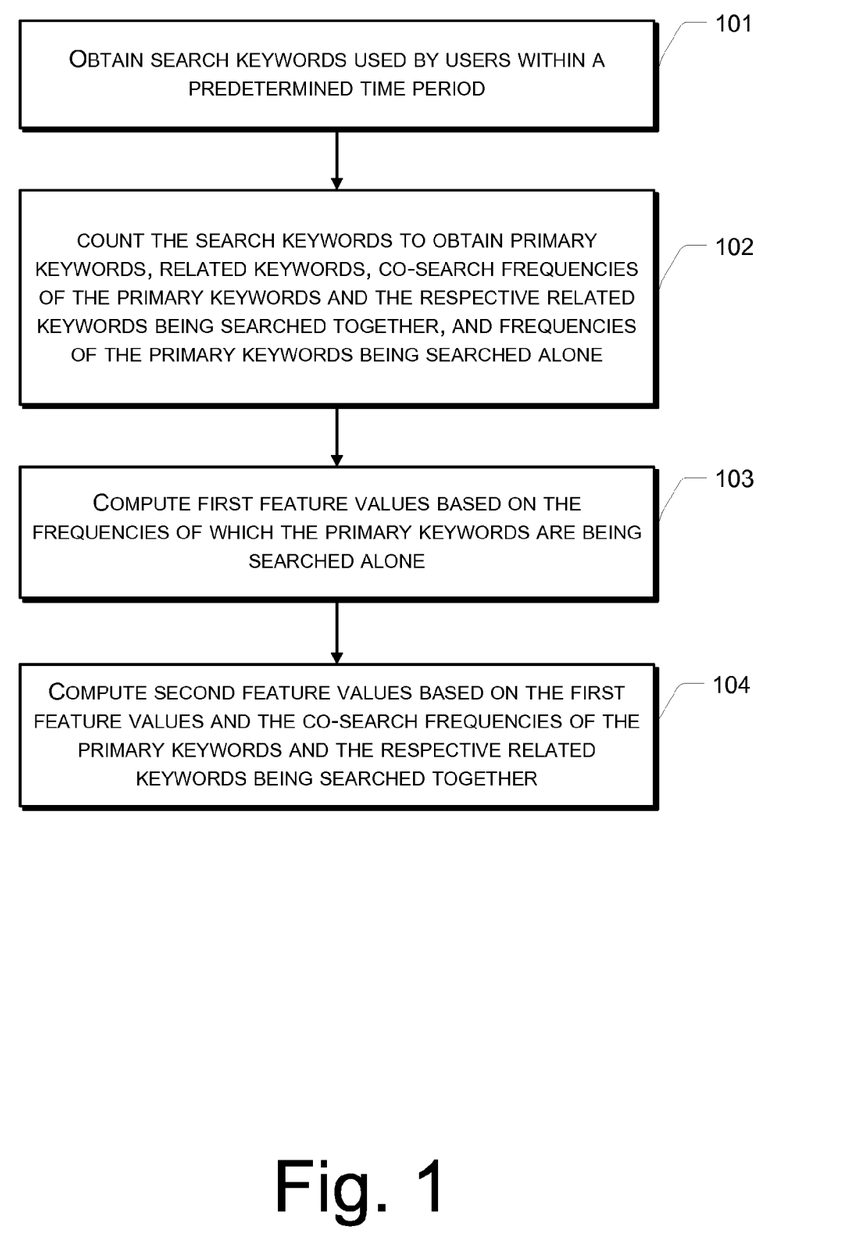
FIG. 1 shows a flow chart of an exemplary method of generating updating parameters in accordance with the present invention.

FIG. 1 shows a flow chart of an exemplary method of generating updating parameters in accordance with the present invention. The method includes the following procedures.

Block 101 obtains search keywords used by users within a predetermined time period.

The predetermined time period may be predetermined by one skilled in the art according to the needs. For example, on a shopping website, in order to have related product keywords that satisfy usage trends of the users, the predetermined time period may be set up to be one week or one month, etc. The search keywords may come from a database, a script program, a local program, a historical record of user inputs, a user client, a server or a storage unit of other device, etc. The present invention does not restrict the manner of doing this.

Block 102 counts the search keywords to obtain primary keywords, related keywords, co-search frequencies of each primary keyword and the respective related keywords being searched together, and search frequencies of the primary keywords being searched alone.

Since keywords in existing techniques are fixed and were created at an earlier time with infrequent updates, these techniques are unsuited for real-time updates and usages of active online contents, and therefore cannot satisfy the user demands. The solution provided herein is to use the statistics of the primary keywords and the related keywords to ensure that users obtain related keywords that satisfy the changing usage trend. In practice, any available method may be used to obtain the primary keywords, the related keywords, the co-search frequencies of each primary keyword and the respective related keywords being searched together, and the search frequencies of the primary keywords being searched alone. For example, a search keyword may be taken as a primary keyword, and the keywords that are searched together with the primary keyword are taken as the related keywords of the primary keyword. The co-search frequencies of each primary keyword and the respective related keywords being searched together, and the search frequencies of the primary keywords being searched alone are then separately counted.

The following counting method that is based on Apriori algorithm is used as an example to illustrate. A basic process of the Apriori algorithm includes: (1) scan a transactional database to find all items having a support not less than a minimum support level to form a frequent itemset L1; (2) link items in L1; (3) scan the transactional database by filtering the items in L1 to obtain an itemset L2 having a support not less than another minimum support level; (4) link items in L2; (5) scan the transactional database by filtering the items in L2 to obtain an itemset L3 having a support not less than still another minimum support level; and so forth. TABLE 1 shows search keywords obtained using this method. TABLE 2 shows primary keywords and their respective frequencies of being searched alone. TABLE 3 shows a further count of the related keywords that have been searched together with the primary keywords, and the respective frequencies of being searched together.

TABLE 1

| 1 | beer, gum, napkin |
| 2 | beer, peanut, gum |
| 3 | beer, milk |
| 4 | milk, sugar |
| 5 | peanut, candies |

TABLE 2

| Primary keyword | Frequency |
| --- | --- |
| beer | 3 |
| peanut | 2 |
| gum | 2 |
| napkin | 1 |
| milk | 2 |
| sugar | 1 |

TABLE 3

| Primary keyword and related keyword | Frequency of being searched together |
| --- | --- |
| beer, peanut | 1 |
| beer, gum | 2 |
| beer, napkin | 1 |
| beer, milk | 1 |
| beer, sugar | 0 |
| peanut, gum | 1 |
| peanut, napkin | 0 |
| peanut, milk | 0 |
| peanut, sugar | 0 |
| gum, napkin | 1 |
| gum, milk | 0 |
| gum, sugar | 0 |
| napkin, milk | 0 |
| napkin, sugar | 0 |
| milk, sugar | 1 |

Primary keywords, related keywords, co-search frequencies of each primary keyword and the respective related keywords being searched together, and search frequencies of the primary keywords being searched alone are therefore obtained using the above rules of counting frequencies.

The above method is only for an illustrative purpose. One may use other methods such as mining association rules according to experiences or needs. The present invention does not restrict the manner of doing this.

Preferably, the present exemplary embodiment may further include a procedure of removing search terms that satisfy a filtering rule. The filtering rule may be predetermined by one skilled in the art based on experience or needs. For example, TABLE 4 represents a remaining result of applying a filtering rule which removes items having a frequency of a primary keyword and a related keyword being searched together that is less than two.

TABLE 4

| Primary Keyword and Related keyword | Frequency of Being Searched Together |
| --- | --- |
| beer, gum | 2 |

Alternatively, the filtering rule may be set up to remove search keywords that are invalid keywords or search keywords that have invalid symbols or invalid phrases. The present invention does not restrict the manner of doing this.

Block 103 computes first feature values based on the frequencies of the primary keywords being searched alone.

For the purpose of meeting usage trends of keywords to better satisfy search demands of the users, the first feature values may be interpreted to represent the popularity of the respective keyword. Under this circumstance, a first feature value may be obtained through a comparison between the frequency of a primary keyword being searched alone and a predetermined popularity value. One formula of computing a first feature value may therefore be:

First feature value=Frequency of a primary keyword being searched alone/Predetermined popularity base value.

TABLE 5 shows an example.

TABLE 5

| Primary keyword | Related keyword | Frequencies of primary keyword and related keywords being searched together | Frequency of primary keyword being searched alone |
| --- | --- | --- | --- |
| bike | E bike, city bike, bicycle | 2, 1, 1 | 2 |
| e bike | bike, city bike, bicycle | 1, 1, 1 | 2 |
| city bike | bike, e bike | 1, 1 | 1 |

In the above table, if the predetermined popularity base value is twenty, the first feature value for the keyword "bike" will be 2/20=0.1, while the first feature value of the keyword "e bike" is 1/20=0.05. Preferably, the popularity base value is a median of the search frequencies of the primary keywords being searched alone. For example, if ten percent of the primary keywords have been each searched alone for ten times, eighty percent of the primary keywords have been each searched alone for twenty times, and ten percent of the primary keywords have been each searched alone for fifty times, the value twenty will be used as the popularity base value. One may determine this popularity base value in advance based on experiences or needs. The present invention does not restrict the manner of doing this.

One may determine the first feature values and the method for computing the first feature values based on experiences or needs. The above method is used only for an illustrative purpose. The present invention does not impose restrictions in this regard.

Block 104 computes second feature values based on the first feature values and the co-search frequencies of each primary keyword and the respective related keywords being searched together. The second feature values are used as updating parameters for determining displaying modes of the related keywords.

Based on the foregoing exemplary embodiments, it is understood that certain correlation parameters between primary keywords and related keywords need to be acquired in practical applications. In this exemplary embodiment, the second feature values obtained based on the first feature values and the co-search frequencies of each primary keyword and the respective related keywords being searched together are a representative example of such correlation parameters. In order to allow the second feature values to fully reflect the usage trends of the keywords, the following procedures are preferably employed in the present exemplary embodiment to compute the second feature values.

A sub-block A1 computes correlation levels based on the frequencies of each primary keyword and the respective related keywords being searched together.

A sub-block A2 obtains the first feature values from a cache, and computes the second feature values based on the first feature values and the correlation levels.

Specifically, the correlation levels are first computed based on the frequencies of each primary keyword and the respective related keywords being searched together. One formula of computing a correlation level may be:

Correlation level=Frequency of a primary keyword and a related keyword being searched together/Predetermined base value of correlation level.

Using the data in TABLE 5, if the predetermined base value of correlation level is ten, the correlation level between the primary keyword "bike" and the related keyword "e bike" corresponds to the frequency of co-appearance of "bike" and "e bike" in the table divided by ten, that is, $2/10=0.2$. Preferably, the base value of correlation level may be a median of the frequencies of each primary keyword and the respective related keywords being searched together. One may predetermine this value based on experiences or needs. The present invention does not restrict the manner of doing this.

In order to improve the computing efficiency, the present exemplary embodiment may store the first feature values in a cache and retrieve them directly from the cache when the second feature values are computed. The second feature values may be computed based on the first feature values and the correlation levels. It is appreciated that retrieving data from a cache is much faster than retrieving data from a database or other devices. Therefore, the preferred embodiment of the present invention may have a better computing performance. Furthermore, storing data in a cache may include saving in the form of a hash, saving in the form of a file, or saving in other forms. In order to facilitate the retrieving of the first feature values, operations such as sorting or ranking the primary keywords may be set up for optimization. The present invention does not have any limitation on the method of optimization.

In order to obtain the second feature values that more closely satisfy user needs, the first feature values and the correlation levels are preferably weighted separately, and the weighted results are taken as the second feature values. For example, if the first feature value of the keyword "e bike" in the previous example is 0.05 with a weight 0.4, and the correlation level between the primary keyword "bike" and the related keyword "e bike" is 0.2 with a weight 0.6, then the second feature value for the primary keyword "bike" and the related keyword "e bike" is obtained as $0.05 \times 0.4 + 0.2 \times 0.6 = 0.14$.

The weights may be set up in advance based on experiences or needs and may also be freely modified based on user needs. The present invention does not restrict the manner of doing this. In order to ensure consistency of computation results, the sum of the weights may be set to be one, or another value.

It is possible for one skilled in the art to use other schemes for computing second feature values. The present invention does not restrict the manner of doing this.

The second feature values are taken as updating parameters that determine displaying modes of corresponding related keywords. For example, related keywords that have a second feature value greater than or equal to a threshold are preferably or constantly displayed, while related keywords that have a second feature value smaller than the threshold are either displayed in a rotating manner or not displayed. The method of displaying the related keywords based on second feature values can be freely set up by one skilled in the art based on experiences or needs. The present invention does not restrict the manner of doing this.

Preferably, the step of counting search keywords, and the steps of computing the first feature values and computing the second feature values are concurrently executed using a multi-threading method in order to improve computing performance and computing efficiency of the system.

The multi-threading mechanism allows concurrent execution of multiple instruction streams with each instruction stream being a thread. Each thread is mutually independent from one another. Execution of multiple threads is concurrent, that is, simultaneous in logical sense. Specifically, multi-threading operation refers to a situation where N executives exist at the same time and are executed simultaneously according to several different execution threads. In order to improve computing performance and computing efficiency of the exemplary embodiments, a thread of counting search keywords and threads of computing the feature values (including the first feature values and the second feature values) are executed concurrently to process the corresponding related keywords in a rotating manner.

Preferably, the exemplary embodiments may further record the primary keywords, the related keywords and the second feature values. The recording may be done in a form, in a file, or any other suitable ways. More preferably, a keyword information table is formed by recording the primary keywords, the related keywords and the second feature values. During the next update, it may only be necessary to remove the existing data in the keyword information table and fill the table again with the updating data according to the exemplary method in the present invention. The update may be performed regularly, in real time or alternated between the two. For example, update may be performed once for each month. Alternatively, the update may be performed freely by a technical person in the art. The present invention does not restrict the manner of doing this.

In order to provide a more intuitive display that directly allows a user to obtain a search hint during a search, the exemplary method preferably further records related first feature values in the keyword information table to further improve the intelligence of the search tool.

In practical applications, one possible scenario is to provide different keywords to different types of users. For example, on a shopping website, users generally include those who buy and those who sell. Under this circumstance, search keywords may include both search keywords used by search users and promulgated keywords posted by promulgating users.

In order to allow one to understand the present invention more clearly, the present invention is described in details using an example in which search keywords include search keywords used by search users (referred to as first search keywords) and promulgated keywords posted by promulgating users (referred to as second search keywords). Specifically, the example includes the following procedure.

A procedure A obtains first search keywords in a first script program within a predetermined time period. The first search keywords come from search keywords used in searches from the time when a user opens a browser to the time when the user closes the browser. For example, in one instance of using a browser, a user conducted multiple searches using a search field and entered multiple keywords. These keywords are counted as the first search keywords in this example. TABLE 6 shows the first search keywords, the first primary keywords, the first related keywords, the frequencies of the first primary keywords and the first related keywords being searched together, and the frequencies of the first primary keywords being searched alone, which are obtained statistically.

TABLE 6

| First primary keyword | First related keywords | Frequencies of the first primary keyword and first related keywords being searched together | Frequency of the first primary keyword being searched alone |
|---|---|---|---|
| bike | e bike, city bike, bicycle | 2, 1, 1 | 2 |
| e bike | bike, city bike, bicycle | 1, 1, 1 | 2 |
| city bike | bike, e bike | 1, 1 | 1 |

A procedure B obtains second search keywords in a second script program within the predetermined time period. The second search keywords come from keywords inputted by users posting about products. These keywords may be obtained as usually more than three keywords are posted. TABLE 7 shows the second search keywords, the second primary keywords, the second related keywords, the frequencies of the second primary keywords and the second related keywords being searched together, and the frequencies of the second primary keywords being searched alone, which are obtained statistically.

TABLE 7

| Second primary keyword | Second related keywords | Frequencies of second keyword and second related keywords being searched together | Frequency of second keyword being searched alone |
|---|---|---|---|
| bike | e bike, city bike, bicycle | 1, 2, 1 | 2 |
| e bike | bike, city bike | 1, 1 | 2 |
| city bike | bike, e bike, bicycle | 2, 1, 1 | 1 |

A procedure C computes first feature values as follows. If the predetermined base value of popularity is twenty, the first feature value represented by the popularity level of "bike" in the first primary keywords would be $2/20=0.1$, and first feature value represented by the popularity level of "e bike" in the first related keywords would be $1/20=0.05$. The first feature values for the second primary keywords and the second related keywords are computed in the same manner above.

A procedure D computes correlation levels as follows. If the predetermined base value of correlation level is ten, a first correlation level and a second correlation level between the primary keyword "bike" and the related keyword "e bike" are then $2/10=0.2$ and $1/10=0.1$, respectively. Based on experience, weights are separately assigned. The weight for the first feature value is 0.2, the weight for the first correlation level is 0.3 and the weight for the second correlation level is 0.5. Therefore, the second feature value for the primary keyword "bike" and the related keyword "e bike" is $0.2 \times 0.05 + 0.3 \times 0.2 + 0.5 \times 0.1 = 0.12$.

As the first feature values for the first keyword and the second keyword are the same in the above example, only one first feature value is used in the computation in order to improve computing efficiency. It is appreciated that the computation result can be obtained by applying the two first feature values in the computation and separately assigning different weights thereto.

A procedure E records the primary keywords, the related keywords and the second feature values to form a keyword information table as shown in TABLE 8.

TABLE 8

| Primary keyword | Related keywords | Values for related keywords |
|---|---|---|
| bike | e bike, city bike | 0.12, ... |
| ... | ... | ... |

Figure 2:
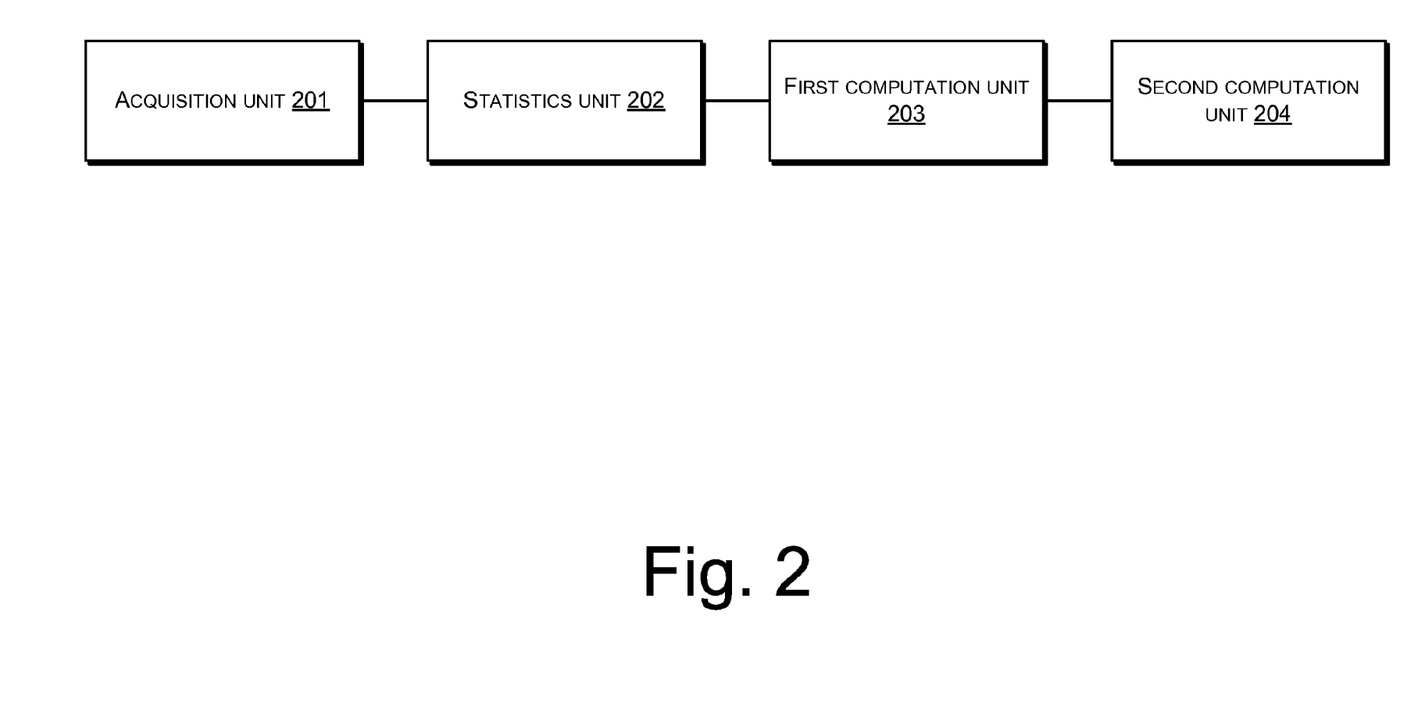
FIG. 2 shows a structural diagram of an exemplary apparatus of generating updating parameters in accordance with the present invention.

FIG. 2 shows a schematic structural diagram of an exemplary apparatus of generating updating parameters in accordance with the present invention. In the apparatus, an acquisition unit 201 is used for obtaining search keywords used by users within a predetermined time period; a statistics unit 202 is used for counting the search keywords to obtain primary keywords, related keywords, co-search frequencies of each primary keyword and the respective related keywords being searched together, and search frequencies of the primary keywords being searched alone; a first computation unit 203 is used for computing first feature values based on the search frequencies of the primary keywords being searched alone; and a second computation unit 204 is used for computing second feature values based on the first feature values and the co-search frequencies of each primary keyword and the respective related keywords being searched together. The second feature values serve as updating parameters that determine displaying modes of the related keywords.

Preferably, the apparatus may further include a recording unit, which is used for recording the primary keywords, the related keywords and the second feature values to form a keyword information table.

Preferably, the statistics unit, the first computation unit and the second computation unit are used for processing concurrent multi-threading operations.

Preferably, the apparatus may further include a filtering unit, which is used for filtering search keywords that meet a filtering rule.

Preferably, the second computation unit includes a correlation computing sub-unit for computing correlation levels based on the co-search frequencies of each primary keyword and the respective related keywords being searched together; and an acquiring/computing sub-unit for obtaining the first feature values in a cache and computing the second feature values based on the first feature values and the correlation levels.

Preferably, the apparatus may further include an addition unit, which is used for recording relevant first feature values in the keyword information table.

Preferably, the search keywords include search keywords used by search users and promulgated keywords posted by promulgating users.

As the exemplary apparatus of generating updating parameters shown in FIG. 2 can correspond to the foregoing exemplary method of generating updating parameters, description of the exemplary apparatus is relatively brief. Any missing details may refer to descriptions of related foregoing portions in the present invention.

Figure 3:
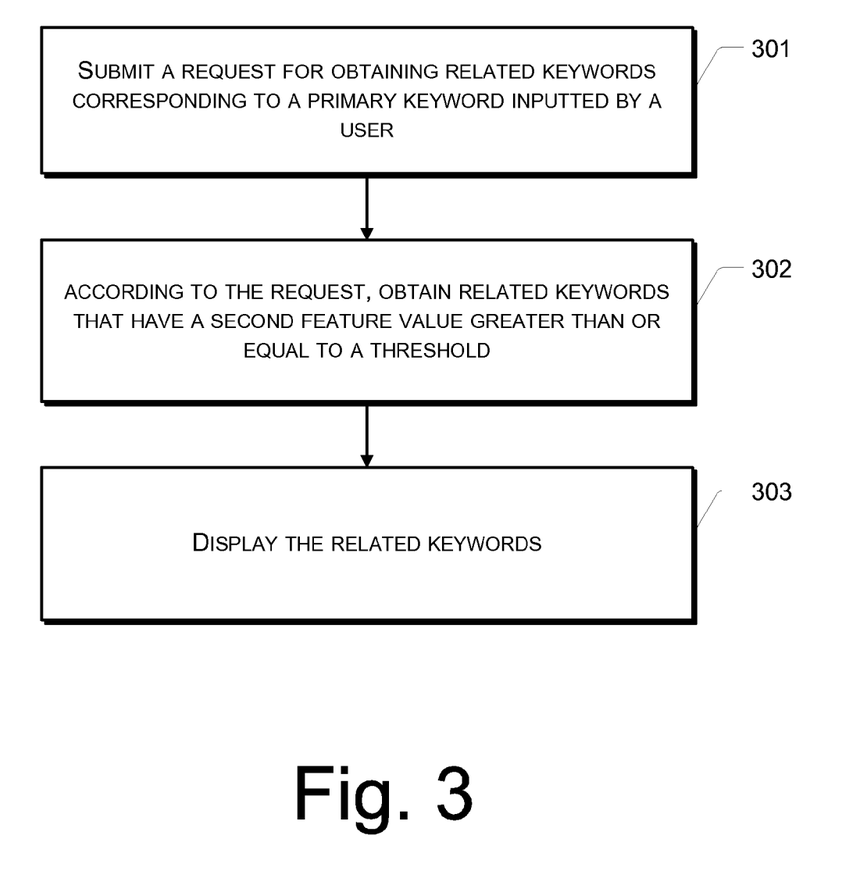
FIG. 3 shows a flow chart of an exemplary method of displaying related keywords in accordance with the present invention.

FIG. 3 shows a method of adding related keywords in accordance with the present invention. The method includes the following procedures.

Block 301 submits a request for acquiring related keywords corresponding to a primary keyword inputted by a user.

Block 302 obtains, according to the request, related keywords that have a second feature value greater than or equal to a threshold. The second feature values are computed based on a first feature value and co-search frequencies of the primary keyword and related keywords being searched together. The first feature value is computed based on a search frequency of the primary keyword being searched alone. The co-search frequencies of the primary keyword and related keywords being searched together, and the search frequency of the primary keyword being searched alone are obtained by counting search keywords.

Block 303 displays the obtained related keywords.

When using a search tool or a search engine, a user may use an input device such as a keyboard or a writing pad to input a primary keyword into a search box or a toolbar, followed by clicking for confirmation, pressing a "Enter" button, pressing a "Tab" button, or any other triggering method, to trigger a local program or a script program of a search page to submit a request for acquiring the related keywords corresponding to the primary keyword.

The second feature values represent a kind of correlation parameters. In order to allow the second feature values to fully reflect the usage trends of the keywords, the present exemplary embodiment preferably first computes correlation levels based on the frequencies of the primary keyword and related keywords being searched together. For example, one formula of computing a correlation level may be:

Correlation level=Frequency of a primary keyword and a related keyword being searched together/ Predetermined base value of correlation level.

Preferably, the base value of correlation level is a median of the frequencies of the primary keyword and related keywords being searched together, and can be predetermined by one skilled in the art based on experience or needs. The present invention does not restrict the manner of doing this.

Results that are computed based on the first feature values and the correlation levels can be used as the second feature values.

As another exemplary embodiment, the first feature values and the correlation levels can be separately weighted, and results obtained can be used as the second feature values. The weights can be predetermined based on experience or needs. Alternatively, the weights can be freely modified as needed. The present invention does not restrict the manner of doing this. In order to ensure the consistency of computation results, the sum of the weights can be set to be one.

It is appreciated that in one skilled the art may use other methods for computing second feature values. The present invention does not restrict the manner of doing this.

In practice, the related keywords whose have a second feature value greater than or equal to the threshold may be displayed every time when the related keywords corresponding to the primary keyword are displayed. Having a second feature value greater than or equal to the threshold indicates that these related keywords are more correlated to the primary keyword. Given this, each time when the related keywords are displayed, a user is provided with highly recommended items that are closely aligned with a usage habit of the user and satisfy a usage trend of the user. This results in a better user experience. For example, related keywords having a second feature value greater than or equal to a threshold (e.g., 0.2) corresponding to the primary keyword "bike" are: electric bike, mountain bike, e bike, e bicycle, suspension bike, scooter, motorcycle, electric scooter, gas scooter and vehicle. In case of a search tool using fixed related keywords, these ten related keywords may constantly appear on the related web page every time when the primary keyword "bike" is searched. In case of a search tool displaying relative keywords in a rotating manner, these ten related keywords may be presented in every rotated related keyword group. When a user submits a request for acquiring related keywords corresponding to "bike", these ten related keywords will appear in the related keyword group that is displayed to the user, regardless of which related keyword group is presented according to a frequency of the request.

Preferably, related keywords having a second feature value smaller than the threshold may be displayed according to an arbitrary rule, or may not be displayed at all. For example, for search tools that only display a fixed number of related keywords, only a fixed number of related keywords having a second feature value greater than or equal to a threshold may be displayed, while the related keywords having a second feature value smaller than the threshold are not displayed. For search tools that display related keywords in a rotating manner or in a full-list display, these related keywords may be displayed according to an arbitrary rule. The present invention does not restrict the manner of doing this.

Figure 4:
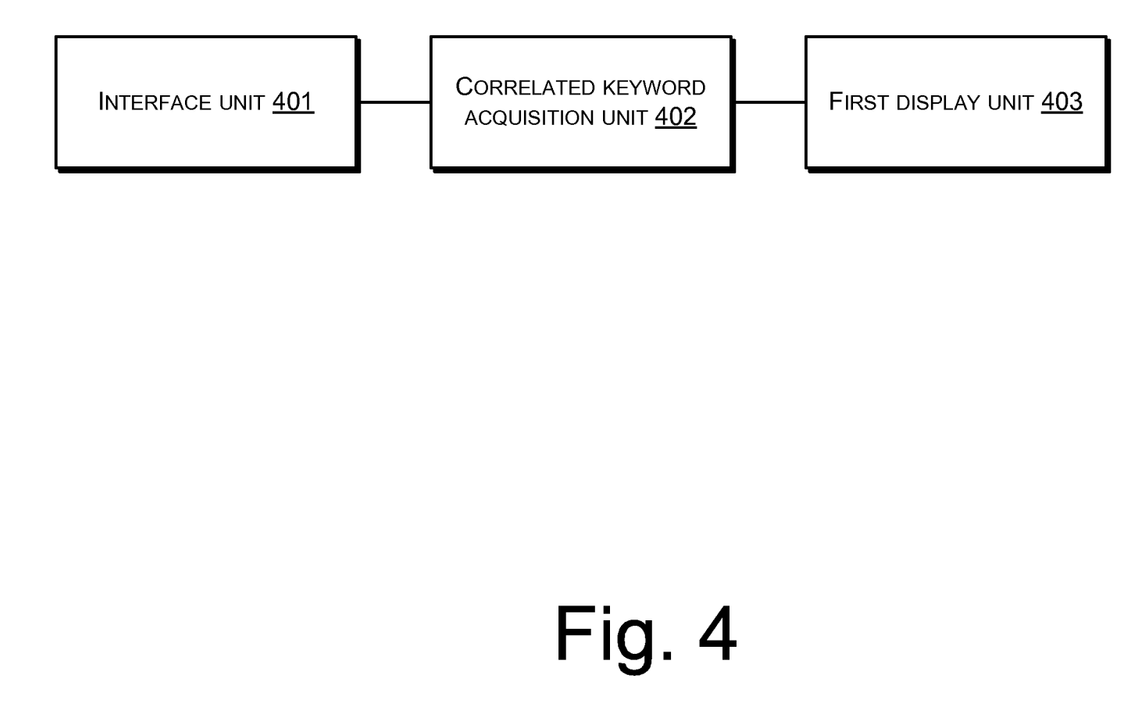
FIG. 4 shows a structural diagram of an exemplary apparatus of displaying related keywords in accordance with the present invention.

FIG. 4 shows a schematic structural diagram of an exemplary apparatus of adding related keywords in accordance with the present invention. In the apparatus, an interface unit 401 is used for submitting a request for acquiring related keywords corresponding to a primary keyword inputted by a user. A related keyword acquisition unit 402 is used for acquiring related keywords having a second feature value greater than or equal to a threshold according to the request. The second feature values are obtained based on first feature values and co-search frequencies of the primary keyword and related keywords being searched together. The first feature value is obtained based on a search frequency of the primary keyword being searched alone. The co-search frequencies of the primary keyword and related keywords being searched together and the search frequency of the primary keyword being searched alone are obtained by counting search keywords. A first display unit 403 is used for displaying the acquired related keywords.

Preferably, the exemplary apparatus may further include a second display unit, which is used for displaying related keywords having second feature values smaller than the threshold.

As the exemplary apparatus of displaying related keywords as shown in FIG. 4 can correspond to the exemplary method of displaying related keywords of FIG. 3, description of the apparatus is relatively brief. Any missing details may refer to descriptions of related foregoing portions in the present invention.

As illustrated, the exemplary embodiments conduct a statistical analysis on search keywords used by a user within a predetermined time period to ensure timely relevance of the keywords. Using the second feature values as correlation parameters for determining displaying modes of the related keywords, the exemplary embodiments provide to the user related keywords that satisfy current usage trend, and thus results in a better user experience.

Second, the disclosed method and apparatus set up a keyword information table. During an update, only data in the table is updated accordingly, thus improving processing efficiency of the system.

Moreover, the step of counting search keywords and the step of computing feature values may be concurrently executed using a multi-threading method, thereby improving computing performance and efficiency of the system.

Furthermore, by storing first feature values in a cache, the disclosed method and apparatus further improve the computing performance and efficiency of the system. By recording the first feature values, the disclosed method and apparatus may further provide the first feature values to the user for reference when displaying primary keywords.

Finally, from a service provider's perspective, the exemplary embodiments of the present invention require no special secret algorithms for implementation, are easy to operate and have a low development cost.

The method and the apparatus of generating updating parameters, and the method and the apparatus of displaying related keywords in the present invention have been described in details above. Exemplary embodiments are employed to illustrate the concept and implementation of the present invention in this disclosure. The exemplary embodiments are only used for better understanding of the methods and the apparatuses of the present invention. Based on the concepts in this disclosure, one of ordinary skills in the art may modify the exemplary embodiments and their application. In general, contents in the present invention should not be construed as limitations to the disclosed methods and apparatuses.

The invention claimed is:

1. A method of generating updating parameters, the method comprising:
   obtaining one or more related keywords associated with a primary keyword, one or more co-search frequencies of the primary keyword and the one or more related keywords, and a search frequency of the primary keyword;
   computing one or more correlation levels based at least in part on the one or more co-search frequencies;
   computing a first feature value based at least in part on the search frequency of the primary keyword; and
   computing one or more second feature values based at least in part on the first feature value, the one or more correlation levels and the one or more co-search frequencies, a second feature value of the one or more second feature values being served as a parameter for determining whether a corresponding related keyword of the one or more related keywords is to be displayed constantly or in a rotating manner.

2. The method as recited in claim 1, the method further comprising recording the primary keyword, the one or more related keywords and the one or more second feature values to form a keyword information table.

3. The method as recited in claim 1, wherein obtaining the one or more related keywords, computing the first feature value and computing the one or more second feature values are concurrently executed using a multi-threading method.

4. The method as recited in claim 1, wherein prior to computing the first feature value, the method further comprises filtering out a plurality of related keywords that satisfy a filtering rule.

5. The method as recited in claim 1, wherein a keyword information table comprises the primary keyword, the first feature value and the one or more second values corresponding to the primary keyword.

6. The method as recited in claim 1, wherein the primary keyword includes a search keyword used by a search user or a promulgated keyword posted by a promulgating user.

7. An apparatus comprising:
   one or more processors;
   memory;
   an acquisition unit stored in the memory and executable by the one or more processors, used for obtaining one or more search keywords used by one or more users within a predetermined time period;
   a statistics unit stored in the memory and executable by the one or more processors, used for counting the one or more search keywords to obtain a primary keyword, one or more related keywords associated with the primary keyword, one or more co-search frequencies of the primary keyword and the one or more related keywords, and a search frequency of the primary keyword;
   a first computation unit stored in the memory and executable by the one or more processors, used for computing a first feature value based at least in part on the search frequency of the primary keyword; and
   a second computation unit stored in the memory and executable by the one or more processors, used for:
   computing one or more correlation levels based at least in part on the one or more co-search frequencies, and
   computing one or more second feature values based at least in part on the first feature value and the one or more correlation levels, wherein a second feature value of the one or more second feature values is served as a parameter for determining whether a corresponding related keyword of the related keywords is to be displayed constantly or in a rotating manner.

8. The apparatus as recited in claim 7, the apparatus further comprising a recording unit, used for recording the primary keyword, the one or more related keywords and the one or more second feature values to form a keyword information table.

9. The apparatus as recited in claim 8, the apparatus further comprising an addition unit connected with the recording unit and used for recording the first feature value in the keyword information table.

10. The apparatus as recited in claim 7, the apparatus further comprising a filtering unit connected with the statistics unit and used for filtering out a plurality of search keywords that satisfy a filtering rule.

11. The apparatus as recited in claim 7, wherein the corresponding related keyword is to be displayed constantly when the second feature value is greater than or equal to a threshold.

12. The apparatus as recited in claim 7, wherein the corresponding related keyword is to be displayed in the rotating manner when the second feature value is less than a threshold.

13. A method implemented by one or more computing devices, the method comprising:
   submitting a request for acquiring related keywords based on a primary keyword;
   in response to receiving the request, obtaining one or more related keywords having one or more second feature values that are greater than or equal to a threshold, wherein the one or more second feature values are computed based at least in part on a first feature value and one or more correlation levels; and
   providing the one or more related keywords for display based at least in part on the one or more second feature values, wherein:
   the first feature value is computed based at least in part on a search frequency of the primary keyword, the one or more correlation levels are computed based at least in part on the one or more co-search frequencies, the one or more co-search frequencies of the primary keyword and one or more related keywords and the search frequency of the primary keyword are obtained by counting search keywords, and a second feature value of the one or more second feature values is served as a parameter for determining whether a corresponding related keyword of the one or more related keywords is to be displayed constantly or in a rotating manner.

14. The method as recited in claim 13, the method further comprising providing another one or more related keywords having corresponding second feature values smaller than the threshold for display.

15. The method as recited in claim 13, wherein obtaining the one or more related keywords having the one or more second feature values greater than or equal to the threshold comprises obtaining each of the one or more related keywords whose second feature value is greater than or equal to the threshold from a keyword information table containing the primary keyword, the one or more related keywords and the one or more second feature values.

16. The method as recited in claim 13, wherein the corresponding related keyword is to be displayed constantly when the second feature value is greater than or equal to the threshold.

17. The method as recited in claim 13, wherein the corresponding related keyword is to be displayed in the rotating manner when the second feature value is less than the threshold.

18. The method as recited in claim 13, wherein the first feature value is obtained by a comparison between the search frequency of the primary keyword and a predetermined popularity value.

19. The method as recited in claim 18, wherein the predetermined popularity value corresponds to a median of search frequencies of a plurality of primary keywords.

20. The method as recited in claim 13, further comprising recording the primary keyword, the one or more related keywords and the one or more second feature values to form a keyword information table.

* * * * *